Feb. 9, 1971 G. L. HERSHMAN ET AL 3,561,282
ADJUSTABLE ANGLE STEERING WHEEL MECHANISM FOR RIDING MOWER
Original Filed July 10, 1968 2 Sheets-Sheet 1
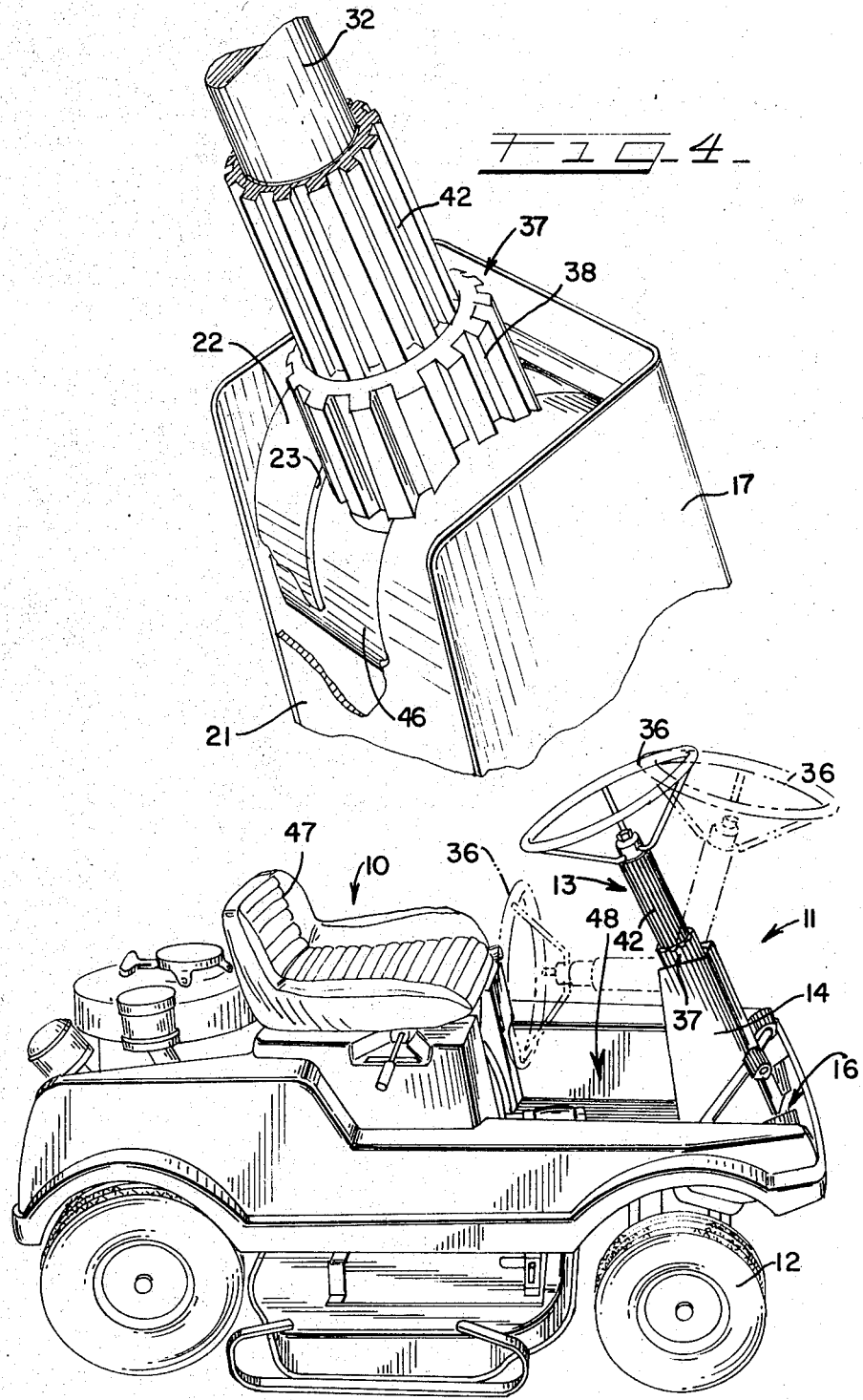
INVENTOR
GORDON L. HERSHMAN
GERALD N. BORCHARDT
BY
ATT'Y.

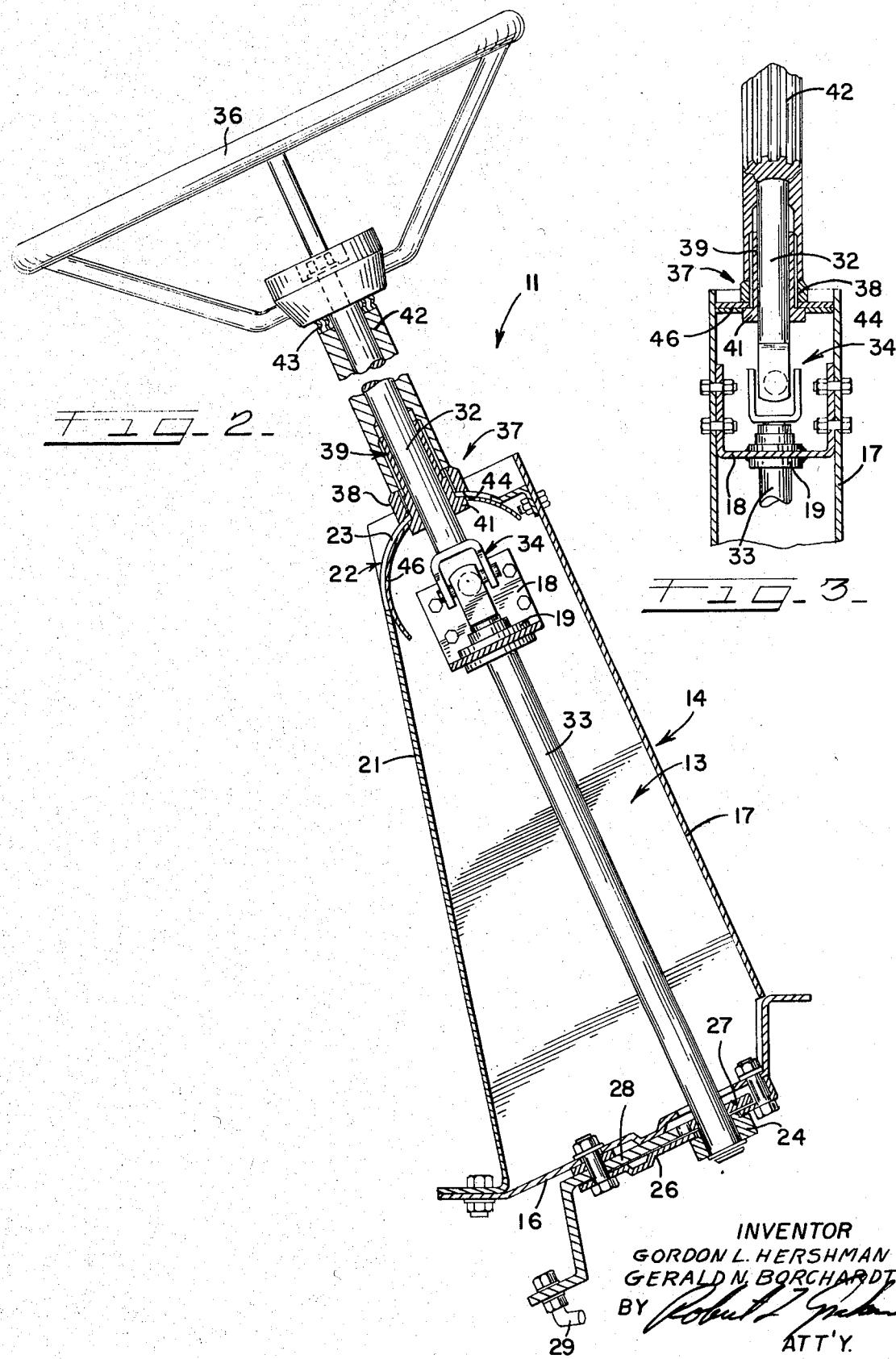

United States Patent Office 3,561,282
Patented Feb. 9, 1971

---

3,561,282
ADJUSTABLE ANGLE STEERING WHEEL MECHANISM FOR RIDING MOWER
Gordon L. Hershman, La Grange, and Gerald N. Borchardt, Clarendon Hills, Ill., assignors to International Harvester Company, Chicago, Ill., a corporation of Delaware
Continuation of application Ser. No. 743,737, July 10, 1968. This application Feb. 5, 1970, Ser. No. 7,404
Int. Cl. B62d 1/18
U.S. Cl. 74—493
11 Claims

ABSTRACT OF THE DISCLOSURE

An adjustable steering assembly for a riding mower and having a pair of relatively movable steering shafts interconnected by a flexible connector. Guide means restricts angular movement of the upper steering shaft to a plurality of positions which include (1) a collapsed, storage position; (2) a swung-away, access position; and (3) intermediate operating positions. A locking device operates to clamp the upper shaft to the guide in any one of said positions.

---

This application is a continuation of application Ser. No. 743,737, filed July 10, 1968, now abandoned.

BACKGROUND AND SUMMARY OF THE INVENTION

The present invention relates generally to riding lawn mowers and more particularly to steering columns used in such mowers.

The typical riding lawn mower for residential use is designed with emphasis on maneuverability and storability. In order to satisfy these design parameters, the machine is generally a compact vehicle crowded with levers and controls. The crowded character of the machine, particularly in the area occupied by the operator, makes accessibility to the operator compartment difficult and frequently requires the location of the steering means to be less than ideal.

The general purpose of the present invention is to alleviate this crowded condition by providing a riding lawn mower with an adjustable steering assembly. As contemplated by this invention, the steering wheel swings to a position removed from the operator's compartment permitting easy access thereto, and is adjustable to an operating position suited to the operator. The steering assembly is also swingable to a storage position wherein the steering wheel is collapsed in the operator's compartment, thus reducing the overall height of the mower. This feature improves the storability of the machine and permits it to be hauled in enclosed vehicles such as conventional station wagons.

The mechanism which provides for the adjustable feature includes a stationary guide and a movable clamp mounted on the steering shaft. The clamp and shaft follow the guide throughout its angular limit. The clamp is actuated by a hand adjustment tube, also mounted on the shaft, to lock the assembly on the guide at any one of the positions within the range of the guide. The tube is conveniently positioned relative to the operator so that adjustment can be made while the mower is in operation. It should be observed that the steering assembly can be moved to any one of the positions (access, operating, or storing) by hand requiring no disassembly of parts.

DESCRIPTION OF THE DRAWINGS

FIG. 1 is a perspective view of the riding lawn mower incorporating the steering assembly of this invention;

FIG. 2 is an enlarged sectional view of the steering assembly shown detached from the lawn mower;

FIG. 3 is a fragmentary sectional view of portions of the steering assembly shown in FIG. 2 and FIG. 4 is a perspective view of the steering shaft lock assembly

DESCRIPTION OF THE PREFERRED EMBODIMENT

With reference to FIG. 1, a riding lawn mower 10 has mounted thereon a steering assembly 11 operative to turn steer the mower front wheels (one shown by reference numeral 12). As described in detail below, the steering assembly 11 is movably adjustable to three positions: operating (solid line position), storage (broken line position), and access (dotted line position).

As shown in FIG. 2, the steering assembly 11 includes a steering column 13 journaled to a column support 14 mounted on a frontal frame portion 16 of the mower 10. More specifically, the column support 14 comprises a rearwardly opening shroud 17 internally of which is mounted a bracket 18. The bracket 18 carries a bearing 19 which journally supports the steering column 13. The open side of the shroud is closed by a plate member 21 having an arcuate supper end 22 which fits snugly between the side walls of the shroud 17. An elongate slot 23 is formed in the arcuate end portion 22 of member 21 and serves to permit angular movement of the steering column 13 relative to the column support 14. The lower end of the steering column is supported in a bearing 24 which is press fit or otherwise secured to cover plate 26. A shaft gear 27, keyed or otherwise secured to the lower end of column 13, meshes with a drag link gear 28. The gears 27 and 28 are maintained in assembled relation by the cover plate 26 bolted to the frame portion 16 and provide the means for imparting rectilinear movement to a drag link 29 in response to rotary movement of the steering column 13.

The steering column 13 comprises a pair of angularly movable upper and lower shafts 32 and 33 interconnected by a flexible coupling 34 such as a universal joint. The lower shaft 33 is stationary, being secured at longitudinal intervals by bearings 19 and 24. The upper shaft 32 extends upwardly from the coupling 34 through the slot 23 projecting substantially above the arcuate end portion 22 of member 21. A steering wheel 36 is bolted to the upper end of shaft 32.

At this juncture it is readily apparent that the upper shaft 32 is angularly movable relative to the stationary, lower shaft 33 within the confines of slot 23. In order to fix the upper shaft 32 at any angular position within the angular range defined by the length of slot 23, a locking assembly 37 is provided. Briefly, the locking assembly includes a pair of clamping members—a collar 38 and a hollow stud 39—concentrically mounted on the shaft 32. The two clamping members 38 and 39 acting upon opposite sides of the arcuate end portion 22 impose a clamping force thereon. More specifically, the stud 39 has formed therein a head portion 41 which engages the under side of the arcuate portion 22. The stud 39 projects upwardly through the slot 23 and is threadedly connected to an adjustment tube 42 which also is concentrically mounted on shaft 32. The inner cylindrical surface of the stud 39 journally supports the upper shaft 32.

The tube 42, freely rotatable on shaft 32, has its lower end abutting the collar 38 and its upper end spaced from the steering wheel 36. A flexible spacer 43 encloses the space between the tube 42 and the steering wheel 36 while permitting axial movement of the former relative to the latter.

The collar 38 has an upper annular surface abutting the lower end of the tube 42, and a lower surface 44 shaped to fit the contour of the arcuate end portion 22. The arcuate portion 22 has a center of curvature coincident with the pivot point of the upper shaft 32 defined by the flexible coupling 34. Thus it will be appreciated that turning of the tube 42 to loosen the stud 39 releases the clamping force of the head portion 41 and the collar surface 44 acting on the arcuate portion 22 disposed therebetween. An arcuate guide 46 welded or otherwise secured to the stud 39 underlies the arcuate portion 22 and has its lateral edges in sliding engagement with the side walls of shroud 17. The guide 46 maintains the stud 39 in fixed relation to the collar 38 and the tube 42. As best seen in FIG. 4, the outer surface of the adjustment tube is knurled to provide a good gripping surface.

Returning to FIG. 1, the mower 10 is provided with a seat 47 and a footwell 48 located between the seat 47 and steering assembly 11. Because of the cramped conditions around the operator's compartment, e.g. seat 47 and foot well 48, a person of large stature may have difficulty in entering or leaving the compartment. In order to make the compartment more accessible, the slot 23 which delimits the angular movement of the upper steering shaft 32 is extended forwardly to permit the shaft 32 to be swung to a position well removed from the compartment. Thus, as the operator approaches the mower 10 with the steering column 13 in the solid line position of FIG. 1, he first turns the adjustment tube 42 to release the locking assembly 37, swings the upper shaft 32 to the forward dotted line position of FIG. 1, and then mounts the mower 10. Once situated in the operator's compartment, he pulls the upper shaft 32 to a comfortable operating position. Holding the upper shaft assembly 32 in the desired position, he turns the adjustment tube 42 to lock the locking assembly 37. While still occupying the operator's compartment and while the machine 10 is running, the operating position of the upper shaft assembly can be changed merely by loosening the adjustment tube 42, shifting the upper shaft assembly 32, and tightening the tube 42.

In storing the mower 10 or in transporting it, the upper shaft assembly 32 is collapsible into the operator's compartment (broken line position of FIG. 1) by the same procedure described above. As is evident from FIG. 1, the overall height is substantially reduced.

In summary then, a riding mower equipped with the steering assembly of this invention provides for improved accessibility and storage, and permits convenient adjustment of the operating position.

What is claimed is:

1. An adjustable steering assembly comprising: a support; steering means mounted in said support; a steering shaft having means mounted thereon to rotate said shaft and actuate said steering means; a flexible connector coupling said shaft to said steering means, providing said steering shaft with an angular movement relative to said steering means effective to dispose said shaft in a plurality of positions; a guide element mounted on said support adjacent said steering shaft; clamping means disposed in frictional engagement with said guide element operative to lock said steering shaft in selected fixed positions relative to said support; and actuating means mounted on said steering shaft and disposed to serve as a support therefor, said actuating means operative to co-act with said clamping means to produce a quantum of frictional engagement with said guide element to selectively decrease and increase the quantum of frictional engagement therewith to effect a substantial releasing and an effective locking respectively of the steering shaft in an infinite number of fixed positions.

2. The invention as recited in claim 1, said guide element comprising an arcuate portion disposed within the extent of the angular movement of said steering shaft, said clamping means movable on said shaft in a following relationship to said arcuate portion, said actuating means comprising a tubular structure disposed concentrically about said steering shaft between said arcuate portion and said means to rotate said shaft, said tubular structure selectively movable axially on said shaft in co-action with said clamping means.

3. The invention as recited in claim 2, said means to rotate said shaft comprising a steering wheel disposed in spaced relation to said guide element and the tubular structure of said actuating means, a resilient spacer disposed in the space between the tube and the steering wheel and operative to fill that space while permitting axial movement of the former relative to the latter.

4. The invention as recited in claim 1, said guide element being in the form of an arcuate plate mounted in a fixed position on said support and having a longitudinal slot formed therein, said steering shaft extending through said slot, and said clamping means including a pair of members movably mounted on said steering shaft and disposed on opposite sides of said guide plate, said actuating means comprising a tubular structure concentrically mounted on said shaft and axially movable thereon to effect a movement of said members relative to each other to selectively increase and decrease the quantum of frictional engagement of said members to said guide plate.

5. The invention as recited in claim 4 and said means to rotate said shaft comprising a steering wheel disposed in spaced relation to said guide plate, and said tubular structure of said actuating means being threadably connected to one of said pair of members and disposed in an abutting relationship to the other said member wherein axial movement of said tubular structure in one direction moves said members apart and axial movement in an opposite direction moves said members together, such movement effecting a releasing and a locking respectively of said shaft relative to said arcuate plate.

6. In a riding lawn mower of the type having an operator's compartment thereon defining an upper extent thereof, an adjustable steering assembly comprising: a support; steering means mounted in said support; steering shaft actuatable of said steering means and having a steering wheel mounted thereon; articulated connecting means operatively connecting said shaft to said steering means while permitting said shaft to be moved angularly relative to said support; guide means disposed in spaced relation to said steering wheel and operative for restricting angular movement of said steering shaft from an upper to a collapsed position proximate the upper extent of said operator's compartment; locking means mounted on said steering shaft operative to produce a variable quantum of frictional engagement with said guide means to lock said shaft in an infinite number of fixed positions between said operating and collapsed positions; and actuating means mounted on said steering shaft and disposed thereon to serve as a shroud for said shaft in the space between said guide means and said steering wheel and operative on said locking means to produce said variable quantum of frictional engagement.

7. The invention as recited in claim 6, said guide means being in the form of an arcuate plate mounted on said support and having an upwardly extending slot formed therein, said steering shaft extending through said slot, said connecting means defining a point of pivot of said steering shaft disposed above the lowermost extent of said slot in said arcuate plate to effect a downwardly angled attitude of said shaft from said pivot point in the collapsed position.

8. The invention as recited in claim 6, said guide means comprising an arcuate plate having an upwardly extending slot therein, said steering shaft extending through said slot, said locking means comprising a pair of members mounted on said steering shaft and each disposed on opposite sides of said arcuate plate, and said actuating means while serving as a shroud for said shaft being operative to move said members relative to said plate to selectively increase and decrease of the quantum of friction engagement of said members to effect a respective releasing and locking of said steering shaft in an infinite number of operating attitudes from said collapsed position to said upper position.

9. The invention as recited in claim 8, said actuating means comprising a tubular structure concentrically disposed on said steering shaft adjacent said arcuate plate in spaced relation to said steering wheel, said tubular structure axially displaceable on said shaft to move said members of said locking means, and resilient means disposed to fill the space between the tubular structure on the steering wheel.

10. The invention as recited in claim 9 and said tubular structure being threadably connected to one of said members of said locking means and engageable with the other said member wherein rotating of said tubular structure in one direction moves said members apart to release said steering shaft, and rotating said structure in the opposite direction moves said members together to lock said steering shaft in a selected position.

11. An adjustable steering assembly comprising: a support; steering means mounted in said support, a steering shaft articulately connected to said steering means and having a steering wheel mounted thereon to rotate said shaft and actuate said steering means; an upwardly extending arcuate guide plate mounted on said support adjacent said steering shaft; locking means comprising a pair of members, one of said members is in the form of a collar concentrically mounted on said upper steering shaft and having an arcuate downwardly facing surface conforming to the curvature of the top surface of said guide plate and frictionally engaged therewith, the other of said members being in the form of a threaded hollow stud having a head portion presenting an upwardly facing surface conforming to the curvature of the underside of said guide plate and frictionally engaged therewith, said stud projecting upwardly through said slot in said guide means; actuating means comprising a tube threadedly connected to said threaded stud and being rotatable in one direction to move said stud axially to clamp said guide between said downwardly facing surface of said collar and said upwardly facing surface of said stud by producing a quantum of frictional engagement therewith to lock said upper shaft in an operating position, and rotatable in the opposite direction to move said surfaces apart to decrease said quantum of friction to release said steering shaft whereby said shaft may be angularly adjusted to selected positions.

References Cited
UNITED STATES PATENTS

| | | | |
|---|---|---|---|
| 1,025,215 | 5/1912 | Stull | 74—493 |
| 1,382,529 | 6/1921 | Morton | 74—531UX |
| 2,185,779 | 1/1940 | Tveidt | 74—493 |
| 2,830,464 | 4/1958 | Winterbauer | 74—493UX |
| 3,198,030 | 8/1965 | Miller et al. | 74—493 |
| 3,504,569 | 4/1970 | Zoltok | 74—493 |

MILTON KAUFMAN, Primary Examiner

U.S. Cl. X.R.

74—531; 280—87